United States Patent [19]

Nowak et al.

[11] Patent Number: 5,111,378

[45] Date of Patent: May 5, 1992

[54] DC CHOPPER CONVERTER

[75] Inventors: Stefan Nowak, Erlangen; Robert Bleisteiner, Dormitz, both of Fed. Rep. of Germany

[73] Assignee: Siemens Aktiengesellschaft, Berlin and Munich, Fed. Rep. of Germany

[21] Appl. No.: 560,597

[22] Filed: Jul. 30, 1990

[30] Foreign Application Priority Data

Aug. 11, 1989 [EP] European Pat. Off. ........ 89114937.0

[51] Int. Cl.⁵ ............................................ H02M 3/335
[52] U.S. Cl. ..................................... 363/98; 363/132; 363/56
[58] Field of Search ................... 363/17, 98, 132, 124, 363/56

[56] References Cited

U.S. PATENT DOCUMENTS

| | | |
|---|---|---|
| 3,260,912 | 7/1966 | Gregory . |
| 3,976,932 | 8/1976 | Collins ................................. 363/132 |
| 4,314,325 | 2/1982 | Siebert .................................. 363/98 |
| 4,688,165 | 8/1987 | Pruitt ................................... 363/132 |
| 4,734,624 | 3/1988 | Nagase et al. ....................... 363/132 |
| 4,855,888 | 8/1989 | Henze et al. .......................... 363/17 |
| 4,926,302 | 5/1990 | Haraba et al. ......................... 363/16 |
| 4,937,725 | 6/1980 | Dhyanchand et al. ................ 363/56 |

FOREIGN PATENT DOCUMENTS 024300 3/1981 European Pat. Off. .
3428239 3/1985 Fed. Rep. of Germany .

Primary Examiner—Peter S. Wong
Attorney, Agent, or Firm—Hill, Van Santen, Steadman & Simpson

[57] ABSTRACT

A DC chopper converter including four switching elements arranged in a four-arm or an H-bridge configuration between power supply terminals and on opposite sides of a load, each switching element having a freewheeling diode connected parallel thereto, whereby at every load current direction, the two switching elements positioned diagonally opposite in the bridge are cyclically clocked such that the means value of the load current is defined by the overlap of the open times of the switching elements, while the two switching elements lying in series are clocked out of phase. Since all the switching elements are clocked, there is a steady transition during load current reversals such that the zero axis crossings of the load current need not be separately acquired for each reversal in the drive current.

28 Claims, 3 Drawing Sheets

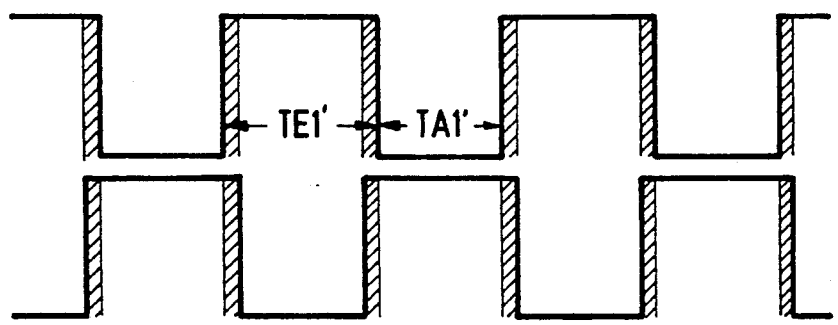
FIG 6
FIG 7
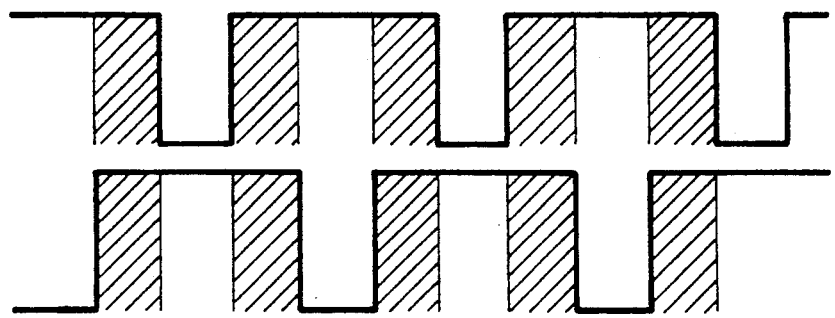
FIG 8
FIG 9
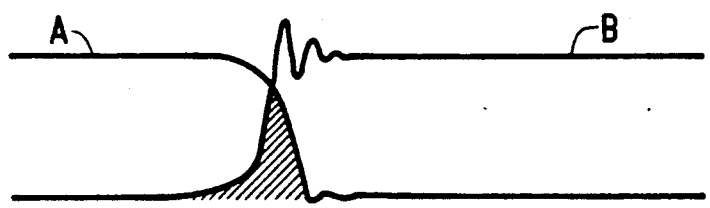
FIG 10
FIG 11
FIG 12
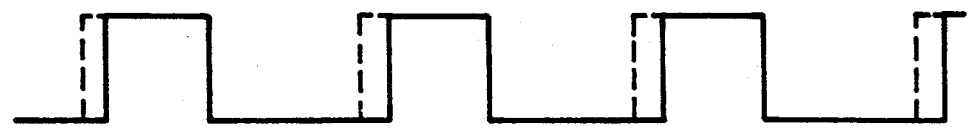
FIG 13
FIG 14

DC CHOPPER CONVERTER

BACKGROUND OF THE INVENTION

The present invention generally relates to DC chopper converters. More specifically, the invention relates to a DC chopper converter for controlling the amplitude and direction of a load current in a bidirectional control bridge of the type having four bridge arms, each arm having a switching element and a free-wheeling diode coupled in parallel, a load being coupled between the junctions of the arms such that an H-configuration is formed between two power supply terminals, switch elements that lie diagonally opposite each other across the bridge being periodically driven or operated so as to control the load current supplied to the load.

A DC chopper converter of the type described above is disclosed in European patent EP 0 024 300 and corresponding U.S. Pat. No. 4,314,325. The disclosures of these patents are fully incorporated herein by reference.

In the disclosed device, a circuit is provided for controlling the amplitude and direction of a load current in a bidirectional direct current control bridge of the type having four bridge arms, each arm having an electronic switching element electrically disposed therein, and a load, illustratively an ohmic-inductive load, connected to the junctures of the bridge arms. The load current is conducted to the load by applying energizing pulses to each of the switching elements in a pair of diagonally disposed bridge arms, the respective pulse energizing signals being out of phase with respect to one another. Load current is responsive to the duration of the interval during which the switching elements in the diagonal pair of bridge arms are simultaneously conducted.

Additionally, circuitry is provided for pulse energizing the electronic switching elements in the second diagonal pair of bridge arms, while inhibiting conduction of the pulse energizing signals to the first diagonal pair, in response to a change in polarity of a control signal. The amplitude of the control signal governs the pulse-width ratio of the pulse energizing signals, and therefore, the duration of the intervals of simultaneous conduction of the switching elements in a diagonal pair. Circuitry is provided for inhibiting the conduction of all pulse energizing signals for a predetermined interval of time in response to the change of polarity of the control signal.

U.S. Pat. No. 4,314,325 discloses other prior art devices for controlling load currents by the use of a four-arm bridge including a publication entitled "Siemens-Zeitschrift 43 (1969), No. 5 and U.S. Pat. No. 3,260,912.

The device stated to be disclosed in the Siemens-Zeitschrift publication comprises a basic four-arm bridge circuit containing electronic switching elements in which a first pair of electronic switching elements which are on diagonally disposed arms of the purchase circuit are periodically and simultaneously closed and opened while the remaining second pair of diagonally disposed switching elements remains open Reversal of the current through the load is achieved by simultaneously opening and closing the second pair of switching elements while the first pair remains opened. It is stated that this method of operating a four-arm bridge control circuit has the advantage of a linear relationship between the control voltage and the load voltage.

It is also stated that it is a disadvantage of the foregoing system that the polarity of the load voltage and the current which flows into the bridge changes during the opening intervals of the periodically operating electronic switching elements. This results because the inductive load component causes load current to remain flowing during intervals that the operated switching elements are open. Such current flows through freewheeling diodes which are disposed and shunt across each such electronic switch. Such diode current flows back into the power supply, in a direction opposite to the current flow during the time that such switching elements are closed, load voltages are reversed concurrently with such bypass diode current. The effect o this operation is that the load will experience a current having a relatively large alternating current ripple component which produces additional heat loss in the load. Moreover, in situations where a motor is used as the load, the large alternating current component can create whining noises.

In U.S. Pat. No. 3,260,912, the teachings of which are fully incorporated herein, there is disclosed another DC chopper converter designed for reducing the amplitude of the alternating current component in the load current by the use of pulse-width control. In this system, a first pair of diagonally disposed electronic switching elements in the bridge are opened and closed during time intervals which are offset with respect to one another. Thus, during the open interval of each such electronic switching elements, the diagonally associated electronic switching elements remain closed. This offset driving arrangement provides an advantage over the above-described simultaneous driving arrangement because the load current which continues to flow after a particular switching element is opened, as a result of the inductive component of the load, does not flow back into the power supply, but circulates through the closed electronic switching element and a free-wheeling diode. This arrangement, therefore, produces after each cycle of switching elements closure which delivers to the load electrical energy from the power supply, a bypass phase which is distinguishable from the energy reversing backflow phase of the previously-discussed arrangement, which does not reverse the load voltage, but reduces it to zero. Thus, the alternating current ripple components in the motor load current have the same pulse frequency as in the first-mentioned arrangement, but only one-half of the magnitude. This arrangement, however, has the disadvantage of a non-linear relationship between the control voltage and the load voltage, particularly in the range of small control voltages. Thus, it is possible in situations where small control voltages are utilized, that the load voltage would approach zero before the control voltage approaches zero. This results from the fact that the conductive intervals of diagonally disposed electronic switching elements cannot overlap because a safety interval must be maintained to prevent electronic switching elements which are disposed on the same half of the bridge from being simultaneously conductive and causing shortcircuit conditions. Similarly, an overlap of the conductive intervals of diagonally opposite switching elements can occur when negative control voltages are utilized only when such control voltages exceed predetermined negative values.

It becomes apparent, therefore, that a bidirectional direct current control bridge, which is operated in accordance with the latter method described above, has a region of insensitivity in which the load voltage is zero for small control voltages. This operational characteristic is a significant disadvantage for most applications. Electronic switching elements of the second diagonal, which are conductive during the non-conductive interval of the first pair of electronic switching elements, do not carry any current. The current is conducted through the free-wheeling diodes which are poled for conduction in a direction which is opposite to the forward conduction of the respectively associated switching elements. This can cause, in some applications, damage to the switching elements.

In all of the arrangements discussed above, the zero crossings of the source current are followed to determine when to switch over from one driving bridge diagonal to the other. Zero crossings in each direction are detected by a pair of detectors that produce an output signal only when an input signal thereto exceeds a predetermined bias signal level. It can be appreciated that a gap can exist between the two bias voltages. As a result, there is a region of insensitivity to zero crossings about the zero crossing axis and this can lead to non-linearities in the load current during switch-over between bridge diagonals. Therefore, the low current can only be precisely set within a limited dynamic range. Certain applications, however, such as in the drive gradient coils for nuclear magnetic resonance tomography, require a greater dynamic range, for example from 2 mA through 200 A, in which the load currents must be precisely controlled.

SUMMARY OF THE INVENTION

The present invention provides an improved DC chopper converter circuit and/or method for operating a DC chopper circuit. An aspect of the invention is a DC chopper converter circuit of the type described above wherein load current is precisely controlled within the zero crossing region, given reversals of the load current directions.

To this end, in an embodiment, the invention provides that switching elements coupled in series in one-half of the bridge circuit are also clocked or driven in offset phase. Since all switching elements, preferably transistors, are clocked in every direction of the load current, only displacement of the pulse duty factor is needed to accommodate transition from one current direction to the other, so that a continuous transition is provided, i.e., one without a kink or ripple in the current curve.

An aspect of the invention is that proceeding from no load current, and given a pulse duty factor of 50% for all switching elements in the bridge circuit as well as the out of phase driving of the switching elements lying on opposite diagonals, the load current can be increased by increasing the pulse duty factor of a pair of switching elements lying on a bridge diagonal. An especially great dynamic range can thus be achieved.

Another aspect of the invention is an embodiment wherein a safety margin time period is taken into consideration and accommodated between on-times of two switching elements coupled in series on one-half of a bridge circuit. This arrangement prevents overlapping closure of two switching elements coupled in series between two power supply terminals so that a short circuit does not occur across the supply terminals.

In one advantageous embodiment of the invention, only two switching elements lying on opposite bridge diagonals are clocked, whereas the respective switching element lying in series with the load remains opened when the load current exceeds a predetermined value. Since this measure is only undertaken for high load currents, it does not interfere with the continuous transition between load current direction changes. Moreover, the safety margin time periods can be relatively short since they need not be provided for higher load currents, which require longer switching times for the switching elements.

In yet another advantageous embodiment of the invention, each pair of serially coupled bridge arms are connected together via an inductor. The free-wheeling diodes are coupled in parallel to the inductor and a switching element terminal rather than only a switching element. The load is connected to taps of the two inductors. In case of a short-circuit arising when two switching elements in two serially connected bridge arms are closed at the same time, the current rise is limited by these inductors. Yet, these inductors hardly limit the rise time of the load current.

These and other features and aspects of the invention are set forth in greater detail below in the detailed description of the presently preferred embodiments and the accompanying drawings.

BRIEF DESCRIPTION OF THE DRAWINGS

FIGS. 6 and 7 are waveform diagrams of the drive currents for switch elements 1 and 4 of FIG. 1 for a low level load current.

FIGS. 8 and 9 are waveform diagrams of the drive currents for switch elements 1 and 4 of FIG. 1 for mid-level load current.

FIG. 10 is a waveform diagram of the output of two bridge switching transistors coupled in series.

FIGS. 11-14 are waveform diagrams of the drive currents for the switch elements of FIG. 1 with safety time margins taken into consideration.

DETAILED DESCRIPTION OF THE PRESENTLY PREFERRED EMBODIMENTS

Figure 1:
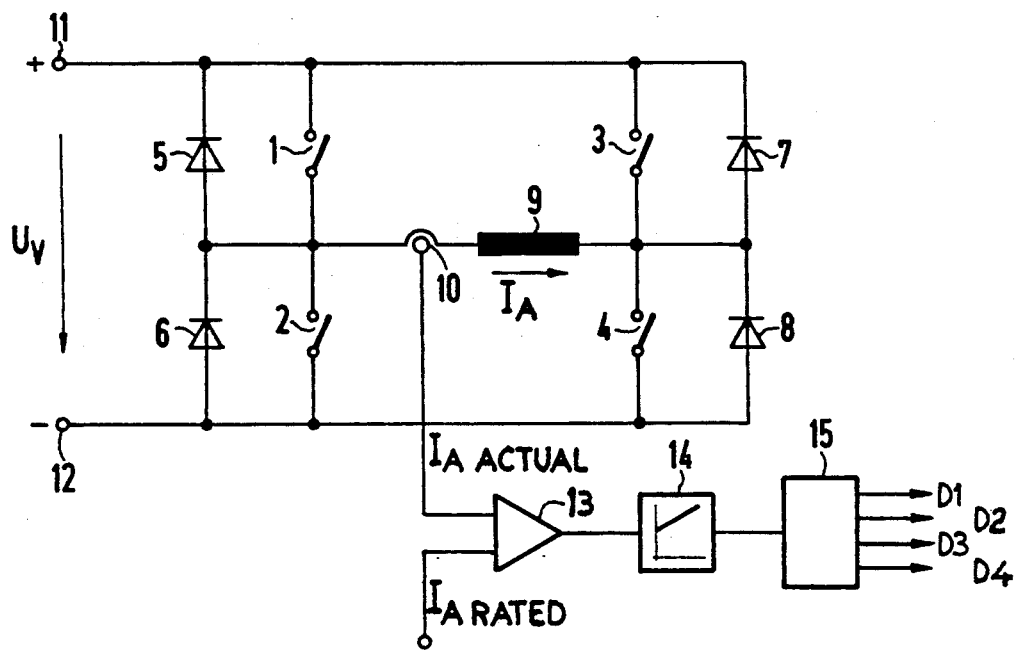
FIG. 1 is a schematic illustration of a DC chopper converter circuit.
Figure 2:
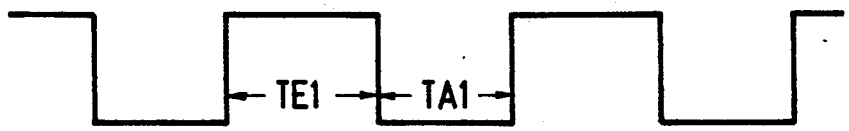
FIGS. 2-5 waveform diagrams of the drive currents for the switching elements 1-4 of FIG. 1 for a load current of zero.
Figure 3:
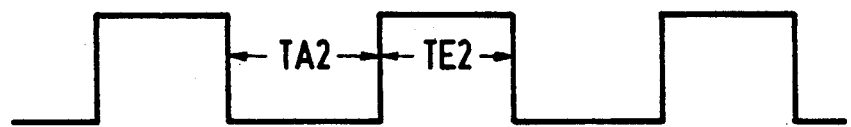
Figure 4:
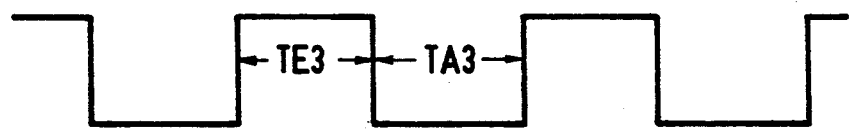
Figure 5:
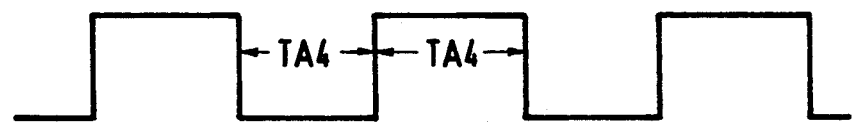
Figure 15:
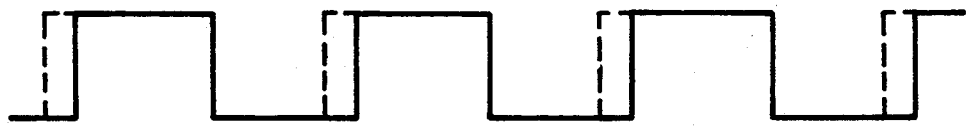
FIGS. 15-18 are waveform diagrams of the drive currents for the switch elements of FIG. 1 for a high level load current.
Figure 16:
Figure 17:
Figure 18:
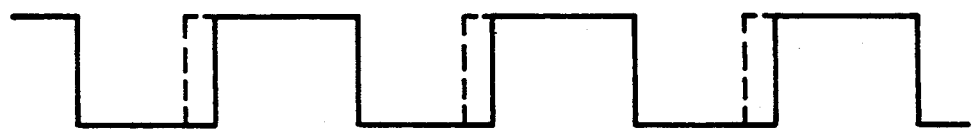

In FIG. 1 there is illustrated a DC chopper converter circuit in typical four-arm or H-bridge configuration. As illustrated, two pairs of serially connected switching elements are coupled between two supply voltage terminals 11 and 12 of a voltage $U_v$. To this end, serially connected switching elements 1 and 2 are coupled between the two supply voltage terminals 11 and 12 and form one leg of the H configuration. Two other serially connected switching elements 3 and 4 are also coupled between the supply voltage terminals 11 and 12 to form the other leg of the H configuration. A load 9 provides the remainder of the H configuration and includes one terminal portion coupled between switching elements 1 and 2 and another terminal portion coupled between switching elements 3 and 4 to thereby form the bridge of the H-configuration.

For the purposes of this specification and accompanying claims, switchings 1 and 4 are considered to be disposed along one diagonal of the H bridge configuration while switching elements 2 and 3 are considered to be disposed along another diagonal of the H bridge configuration. Thus, switching elements 1 and 4 constitute one diagonal pair of switching elements, while switching elements 2 and 3 constitute another diagonal pair of switching elements at the same time, switching elements 1 and 2 are considered to be vertically disposed and to comprise one pair of vertically disposed switching elements. Similarly, switching elements 3 and 4 comprise another pair of vertically disposed switching elements.

Each switching element has a free-wheeling diode connected parallel to it, whereby all the free-wheeling diodes are poled for conduction opposite the polarity of the supply voltage. A free-wheeling diode 5 is coupled parallel to switch 1, while free-wheeling diode 6 is coupled parallel to switch 2, free-wheeling diode 7 is coupled parallel to switch 3, and free-wheeling diode 8 is coupled parallel switch 4.

As further illustrated, a load current $I_A$ flows through the load 9 and is captured by a transducer element 10. The captured current is supplied to a comparator 13 from the transducer 10 as actual value $I_A$ actual. The actual value $I_{Aist}$ is compared to a rated value $I_{Asoll}$ in the substracting amplifier 13. An output of the subtracting amplifier 13 is supplied to a regulator 14 which, in turn, supplies its output to a control circuit 15. The control circuit 15 includes four drive signal outputs D1, D2, D3 and D4 that are supplied to the switching elements 1, 2, 3, and 4, respectively. Thus, the switching elements 1, 2, 3, and 4 are driven in view of the difference signal appearing at the output of subtracting amplifier 13.

The regulator 14 preferably comprises a proportional-plus-integral (PI) unit. The output of the regulator 14 thus preferably represents the signal difference times a proportionality constant plus the integral of the difference.

The switching elements 1-4 preferably comprise transistors, for example FET (field effect) power transistors. The load 9 preferably is an inductive load (e.g., a motor) so that a continuous load current usually arises given adequate switching frequency of the switching elements 1-4. As long as the load 9 is separated from the supply voltage terminals 11 and 12, the current driven by the conductivity of the load 9 flows across corresponding free-wheeling diodes 5-8 as well as across switching elements 1-4 that may still be closed.

The load current $I_A$ can be arbitrarily controlled and can assume positive and negative values. When, for example, the DC chopper converter is utilized in a nuclear magnetic resonance apparatus for the power supply of gradient coils, a slight deviation from a prescribed rated curve of the load current is especially important. In particular, extremely small currents must be precisely set. For example, the required dynamic range lies between 2mA and 200 A. As the following consideration illustrates, this dynamic range is not possible merely by simultaneous switching of two switching elements lying diagonally opposite one another, for example the simultaneous switching of switching elements 1 and 4, or by permanently turning on one of these two switching elements and clocking the other switch.

A required pulse width $t_p$ is proportional to a desired, stationary current I as illustrated in the following equation: $t_p = k \times I$; whereby k is a proportionality constant.

The proportionality constant k is equal to the ohmic resistance of the load 9 divided by the switching frequency multiplied by the supply voltage. Accordingly, the following equation is valid:

$$k = R \div (f \times UV);$$

where R is the ohmic resistance of the load 9, f is the switching frequency, and UV is the supply voltage.

Given typical values of a resistance R = 100 mOhms, a switching frequency f of 25 kHZ and a load current $I_A = 200$ amps, a switching time $t_p$ of 2.5 $\mu$s results. When the load current $I_A$ is then to be set to 2 mA, a desired pulse width of the respective switching element 1-4 of $t_p = 26.6$ ps results. However, such a short on-time cannot be realized using only a transistor as a switch element.

Since this short on-time cannot be realized with a transistor, in accordance with the invention, the on-time preferably is generated by the overlap of the on-times of two switching elements 1 and 4 or 2 and 3, respectively, arranged along a bridge diagonal. This is set forth in greater detail below with reference to FIGS. 2-9.

In FIGS. 2-5, there are illustrated waveform diagrams for the drive currents for the switch elements 1-4. Accordingly, these waveform diagrams illustrate the switching status of the switching elements 1-4, the case wherein the load 9 is not to be supplied with a supply voltage.

As illustrated, the switching elements 1 and 4 (FIGS. 2 and 5), just like the switching elements 2 and 3 (FIGS. 3 and 4) are operated in a push-pull action so that no overlap between the on-times thereof occurs, thus, the load 9 is not coupled to the supply voltage $U_\nu$. The switching elements 2 (FIG. 3) and 4 (FIG. 5) are each respectively switching elements in a push-pull action relative to the switching elements 1 (FIG. 2) and 3 (FIG. 4), respectively, in order to avoid a short circuit between the supply terminals 11 and 12. The pulse-duty factor, i.e, the ratio of on-time TE to off-time TA, is equal to one for all of the switching elements 1-4, for this situation.

When one wishes to increase the load current $I_A$, then the pulse-duty factor of two switching elements lying on the same bridge diagonal is increased, i.e., the on-time TE is increased relative to the off-time TA. This is accomplished by shortening the off-time TA. The selection of the switch pair driven in this manner depends on the desired direction of the change in the current $I_A$. In the two remaining switching elements, that do not carry current, the on-time simultaneously is shortened to reduce the pulse-duty factor.

In FIGS. 6-9, there are illustrated waveform diagrams for the drive circuits of the circuits 1-4 wherein the supply voltage $U_V$ is to be applied to the load 9. Accordingly, the waveform diagrams illustrated the switching status of the switching elements 1-4.

With reference to FIG. 6 (switching status of switch 1) and FIG. 7 (switching status of switch 4), it should be appreciated that an overlap of the on-times occurs in the regions depicted with hatch marks. During this period, the load 9 is supplied with the supply voltage $U_V$ so that a corresponding change in the current $I_A$ occurs.

In accordance with the invention, the pulse-duty factors, i.e. the on-times of the switching elements 1 and 4 can be further increased as illustrated in FIG. 8 (switching status of the switch 1) and FIG. 9 (switching status of the switch 4), so that the hatched overlapped times become even greater. Accordingly, a greater change in the current $I_A$ in the load occurs due to the longer application of the supply voltage $U_V$ thereto.

In the drive situations illustrated in FIGS. 6-9, the switching elements 2 and 3 that are connected in series with the switching elements 1 and 4, respectively, are driven out of phase, i.e., so that no short across the terminals 11 and 12 of the supply voltage $U_V$ occurs. For the sake of clarity and ease of understanding, the switching diagrams for the switching elements 1 and 4 have been omitted in FIGS. 6-9.

In view of the foregoing, it can be seen that overlap times, and thus, the resulting stationary current can be made arbitrarily small, at least theoretically. However, the switching elements 1-4 in fact do not enjoy sharp turn-ons and turn-offs. Accordingly, the switching elements do not have arbitrarily steep switching element edges.

As is illustrated in FIG. 10, however, the overlap need not be formed by rectangular pulses. A curve A in FIG. 10 illustrates the typical turn-off behavior of a transistor while a curve B illustrates the typical turn-on behavior of a transistor. The overlap time that is critical for control purposes is illustrated by a hatched region C.

The illustrated drive control has the special advantage that a steady transition from the positive load current $I_A$ to a negative load-$I_A$ is possible.

The turn-on and turn-off time of transistors cannot be neglected, however, and must be taken into consideration in the drive. It must be assured that the switching elements 1 and 2 or 3 and 4, respectively, lying in series in serially coupled bridge arms are never turned on simultaneously. Since the power supply source $U_V$ should have an optimally low inductance, the simultaneous turn-on would lead to a short circuit having an extremely rapid rise and, thus, would lead to a destruction of the switching elements 1-4. In order to prevent this from occurring, the duration of a turn-on command or instruction for a transistor ($t_{on}$) in a bridge arm must be delayed by a safety margin time $t_{tot}$ in comparison to duration of transistor turn-off ($t_{off}$) for the transistor lying in the same bridge half. Thus, the following equation is employed:

$$t_{tot} = t_{off} - t_{on}$$

FIGS. 11-14 illustrate switching waveforms for the switching elements 1-4, whereby the safety margin times $t_{tot}$ are schematically illustrated. The solid lines illustrate the actual driving current waveforms taking a safety margin time $t_{tot}$ into consideration. The broken lines illustrate the theoretical turn-on times for the switching elements. In comparison to the actual waveform, the safety margin time $t_{tot}$ is illustrated in greatly exaggerated form for the sake of clarity and understanding.

It can be appreciated that the turn-off time of a transistor is highly dependent on the current that the transistor carries just before the turn-off time. Without undertaking further measures, the safety margin time $t_{tot}$ would have to be designed for a maximum current, for example, 200 amps. Accordingly, the safety margin time $t_{tot}$ would have to be made relatively long.

A shortening of the safety time $t_{tot}$ becomes possible when the two switching elements in the diagonal that does not carry current are entirely shut-off as soon as the load current $I_A$ exceeds a defined value (for example, 10 amps). A corresponding switching diagram for the switching elements 1-4 is shown in FIGS. 15-18 for the direction of current. In this case, only the switching elements 1 and 4 are clocked, so that a positive load current $I_A$ flows, whose amount is defined and controlled by the overlap time of the on-times of the switching elements 1 and 4. The switching elements 2 and 3 (FIGS. 16 and 17) remain shut-off since the load current $I_A$ has exceeded a defined value.

Such an arrangement preserves the advantage of the continuous zero-axis crossing of the load current $I_A$ since all switching elements 1-4 are clocked given low currents and, thus, a steady transition can be made from one direction of the current to the other. On the one hand, however, the safety time $t_{tot}$ only has to be designed to the turn-off times at a relatively low current and can thus be kept short.

Figure 19:
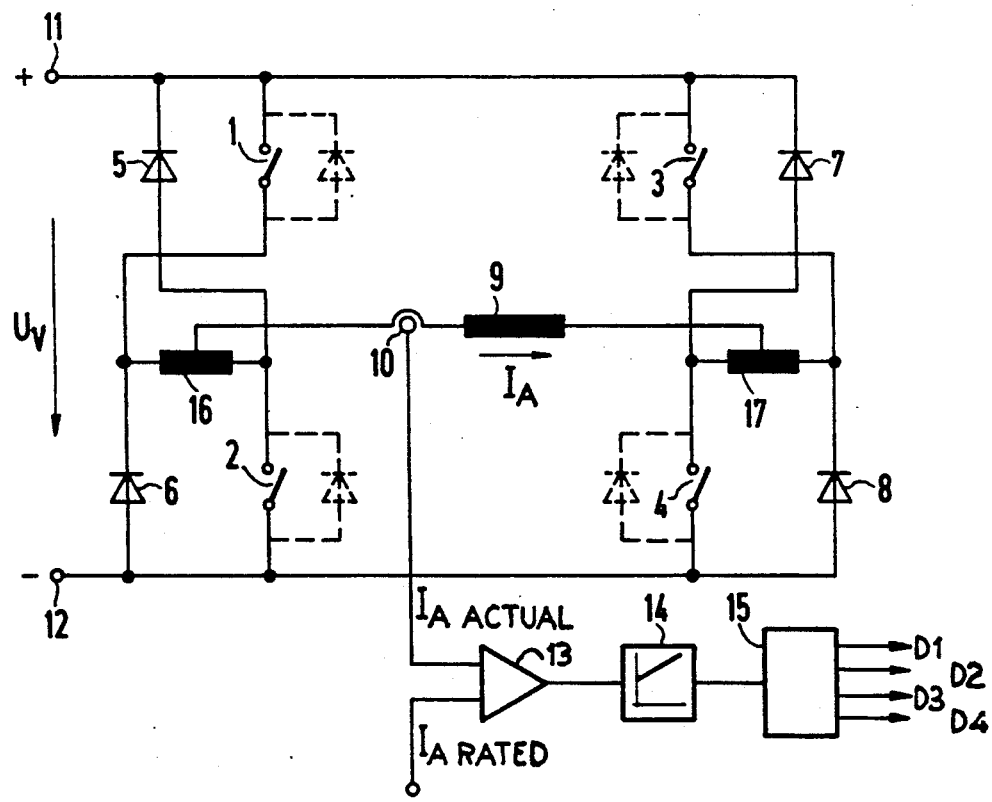
FIG. 19 is a schematic view of another DC chopper converter circuit.

A further solution of the short-circuit problem that can arise due to overlap of the on-times of two switching elements 1 and 2 or, respectively, 3 and 4 lying in serially coupled bridge arms is illustrated in FIG. 19. As illustrated, the circuit of FIG. 1 is modified such that inductors 16 and 17 are coupled between serially connected bridge arms. Accordingly, inductor 16 is coupled between switching elements 1 and 2 and inductor 17 is coupled between switching elements 3 and 4. Thus, if switching elements 1 and 2 are closed at the same time, the short circuit current must also pass through the inductor 16. Similarly, the current would pass through inductor 17 if switching elements 3 and 4 were simultaneously closed.

As further illustrated, the free-wheeling diodes 5-8 are repositioned such that they are no longer coupled parallel only with their respective switching elements 1-4. Instead, each diode 5-8 is coupled parallel to its respective switching element 1-4 and the associated inductor 16 or 17. Thus, each free-wheeling diode is still coupled in series with the switching element coupled in series with the switching element previously associated with the diode. However, the two diodes of a bridge half previously coupled in series now include an inductor coupled therebetween.

Each inductor 16 and 17 is provided with a tap to which the load 9 is coupled. Thus, the load 9 is coupled between portions of inductors 16 and 17.

In this arrangement, should a short occur between terminals 1 and 12 by virtue of the simultaneous closure of switching elements 1 and 2 or 3 and 4, current rise is limited by the inductor 16 or, respectively, 17. At the same time, however, because the load 9 is connected only to taps of the inductors 16 and 17, the inductors do not adversely affect the load current rise.

Moreover, a problem that specifically arises given the use of MOSFET transistors as the switching elements is also solved. MOSFET transistors have an inherent free-wheeling diode that is depicted by the broken lines illustrated in FIG. 19. This free-wheeling diode exhibits the unpleasant property that it normally switches elements more slowly than the allocated switching path of the MOSFET. However, due to the presence of the inductors 16 and 17, the rise of a short-circuit current is retarded and the significantly faster diodes 5-8 then remain effective as the free-wheeling diodes in this circuit.

While preferred embodiments have been shown, modifications and changes may become apparent to those skilled in the art which shall fall within the spirit and scope of the invention. It is intended that such modifications and changes be covered by the attached claims.

I claim:

1. A method for controlling a DC chopper converter with four switching elements operatively coupled between power supply terminals and a load to form an H-bridge configuration, comprising the steps of:
   cyclically driving diagonally disposed switching elements so that said diagonally disposed switching elements experience one or more overlap periods of concurrent closure over any number of cycles;
   cyclically driving non-diagonally disposed switching elements in offset phase so that no non-diagonally disposed switching element is closed concurrently with closure of a diagonally disposed switching element and;
   varying the amount of current through said load by varying the overlap period of concurrent closure.

2. The method of claim 1, wherein the step of varying said load current is further defined by increasing said load current by increasing a pulse duty factor of diagonally disposed switching elements.

3. The method of claim 1, including the further step of inserting a safety margin time period between closures of vertically disposed switching elements.

4. The method of claim 1, further comprising the step of preventing closure of one pair of diagonally disposed pair of switching elements when said load current exceeds a predetermined value.

5. The method of claim 1 further comprising the steps of:
   sensing the amount of current through said load;
   comparing said sensed amount to a rated value to generate a difference signal; and
   using said difference signal to drive a controller which controls switching of said switching elements.

6. The method of claim 5, further comprising the step of regulating said difference signal by generating a proportional plus integral signal in response to said comparison of said current through said load to said rated value; and then using said proportional plus integral signal to drive said controller to control switching of said switching elements.

7. A DC chopper converter including four electrical junction points 1, 2, 3 and 4, comprising:
   (a) a power supply coupled across points 1 and 2;
   (b) a first switching element coupled between points 1 and 3;
   (c) a second switching element coupled between points 3 and 2;
   (d) a third switching element coupled between points 1 and 4;
   (e) a fourth switching element coupled between points 4 and 2;
   (f) controller means operatively coupled to said switching elements for driving said first and fourth switching elements in offset phase with respect to said second and third switching elements and for driving any diagonally disposed pair of switching elements to have one or more periods of concurrent closure over any number of consecutive cycles, and thereby generating a current through said load defined by an amount of overlap of closure periods for said first and fourth or said second and third, switching elements, said controller means preventing a short circuit between points 1 and 2 through any of said switching elements by said offset driving of said switching elements.

8. The DC chopper of claim 7, further comprising:
   a first free-wheeling diode coupled between points 1 and 3;
   a second free-wheeling diode coupled between points 3 and 2;
   a third free-wheeling diode coupled between points 1 and 4; and
   a fourth free-wheeling diode coupled between points 4 and 2.

9. The DC chopper converter of claim 7, wherein said switching elements comprise transistors.

10. The DC chopper converter of claim 7, wherein said switching elements comprise field effect transistors.

11. The DC chopper converter of claim 7, wherein said switching elements comprise metal-oxide-silicon field effect transistors.

12. The DC chopper converter of claim 7 further comprising:
   transducer means operatively coupled for sensing current flow through said load; and
   subtracting amplifier means for generating a difference signal representing a difference between current sensed by said transducer means transducer and a rated value, said difference signal being supplied to said controller means to drive said switching elements.

13. The DC chopper converter of claim 12, further comprising a regulator operatively coupled in series between said subtracting amplifier means and said controller means.

14. The DC chopper converter of claim 13, wherein said regulator comprises a means for generating a proportional plus integral signal of said difference signal.

15. A DC chopper converter including six electrical junction points 1–6, comprising:
   (a) a power supply coupled across points 1 and 2;
   (b) a first switching element coupled between points 1 and 3;
   (c) a first indicator coupled between points 3 and 4 are provided with a tap;
   (d) a second switching element coupled between points 4 and 2;
   (e) a third switching element coupled between points 1 and 5;
   (f) a second inductor coupled between points 5 and 6, provided with a tap;
   (g) a fourth switching element coupled between points 6 and 2;
   (h) a load coupled between said taps of said first an second inductors;
   (i) transducer means operatively coupled for sensing current flow through said load;
   (j) subtracting amplifier means operatively coupled to said transducer for generating a difference signal representing a difference between said sensed current and a rated value; and
   (k) controller means operatively coupled to said subtracting amplifier means, for controlling switching of said switching elements in response to said difference signal for driving diagonally disposed switching elements to have one or more overlap periods of concurrent closure over any number of consecutive cycles and for driving non-diagonally disposed switching elements in offset phase so as to have no period of concurrent closure.

16. The DC chopper converter of claim 15, further comprising:
a first free-wheeling diode coupled between points 1 and 4; a second free-wheeling diode coupled between points 3 and 2; a third free-wheeling diode coupled between points 1 and 6; and a fourth free-wheeling diode coupled between points 5 and 2.

17. The DC chopper converter of claim 15, wherein said switching elements comprise transistors.

18. The DC chopper converter of claim 15, wherein said switching elements comprise field effect transistors.

19. The DC chopper converter of claim 15, wherein said switching elements comprise metal-oxide-silicon field effect transistors.

20. The DC chopper converter of claim 15, further comprising a regulator operatively coupled in series between said subtracting amplifier means and said controller means.

21. The DC chopper converter of claim 20, wherein said regulator comprises means for generating a proportional plus integral signal of said difference signal.

22. The DC chopper converter of claim 20, wherein said regulator comprises means for generating a proportional plus integral signal of said difference signal.

23. A DC chopper converter comprising four switching elements operatively coupled between two power supply terminals and a load in H configuration for supplying current to the load, the load connected between diagonal pairs of said switching elements, and controller means coupled to said switching elements for driving said switching elements such that switching elements in one of said diagonal pairs are periodically clocked and have one or more periods of concurrent closure, said periods of concurrent closure extending over any number of consecutive cycles, for setting a means value of said load current defined by the period of concurrent closures of the switching elements of the pair, and said controller means driving the switching elements in the other diagonal pair clocked in off-set phase every cycle for preventing simultaneous closure of non-diagonal switching elements.

24. The DC chopper converter of claim 23, wherein the load current is increased by increasing the pulse duty factor of the switch pair lying along the diagonal through which the load current is conducted.

25. The DC chopper circuit of claim 23, wherein said controller means includes means for inserting a safety margin time between periods of concurrent closure of two vertically disposed switching elements among the switching elements in said diagonal pairs.

26. The DC chopper circuit of claim 23, wherein only two switching elements lying diagonally opposite one another are clocked while the respective switching element vertically disposed therewith remains turned off when the load current exceeds a predetermined value.

27. The DC chopper converter of claim 23, wherein the switching elements in each bridge arm are connected in series via an inductor.

28. The DC chopper converter of claim 23 further comprising transducer means operatively coupled for sensing current flow through said load, subtracting amplifier means operatively coupled to said transducer means and a supplied with a rated value for generating a difference signal representing a difference between current sensed by said transducer means and said rated value, and a regulator operatively coupled in series between said subtracting amplifier means and said controller means, said controller being driven by said output of said regulator.

* * * * *